G. W. CHANCE.
MACHINE FOR MOLDING PLASTIC MATERIALS.
APPLICATION FILED AUG. 3, 1916.
1,201,439.
Patented Oct. 17, 1916.
2 SHEETS—SHEET 1.
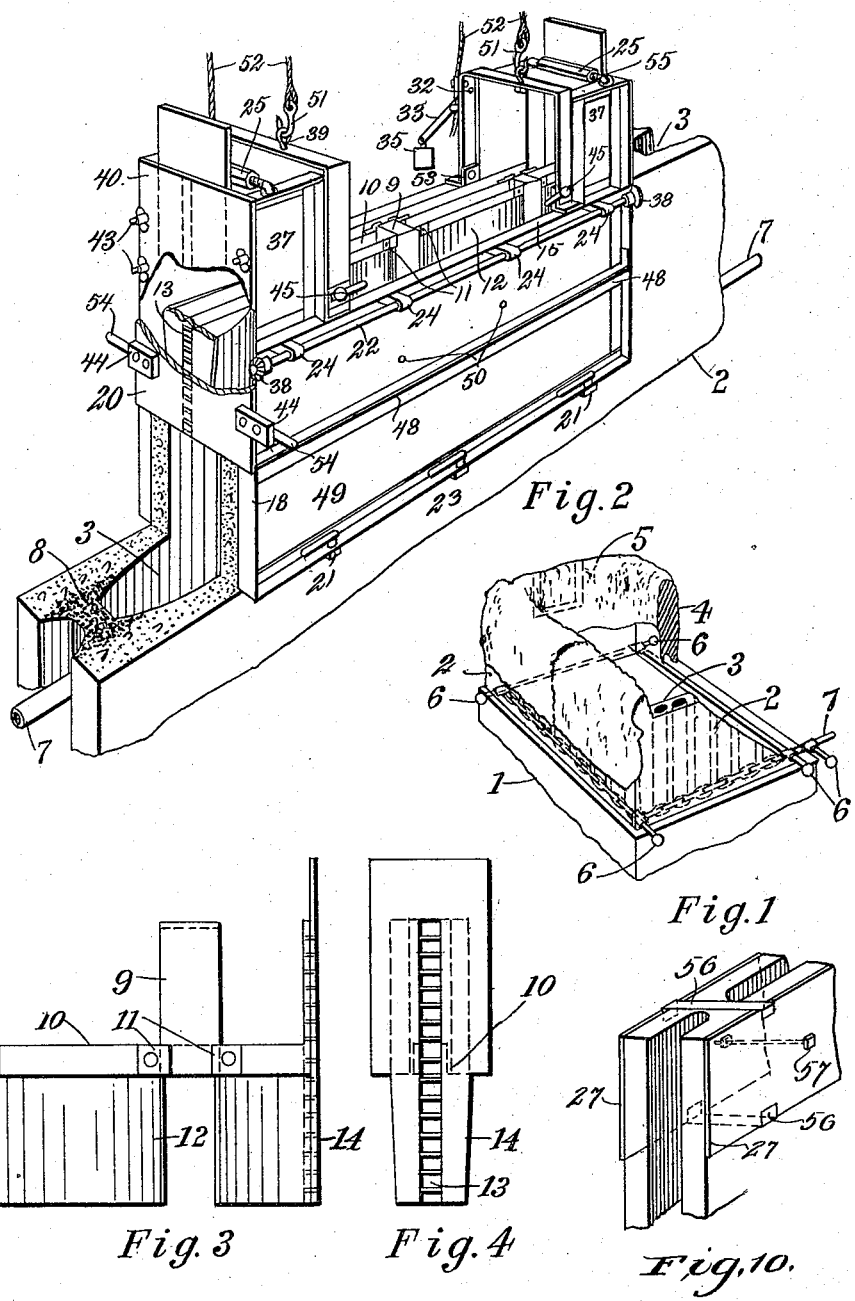
Witnesses:
Otto G. Lindberg
A. G. Hagstrom
Inventor
George Whitefield Chance G. W. CHANCE.
MACHINE FOR MOLDING PLASTIC MATERIALS.
APPLICATION FILED AUG. 3, 1916.
1,201,439.
Patented Oct. 17, 1916
2 SHEETS—SHEET 2.
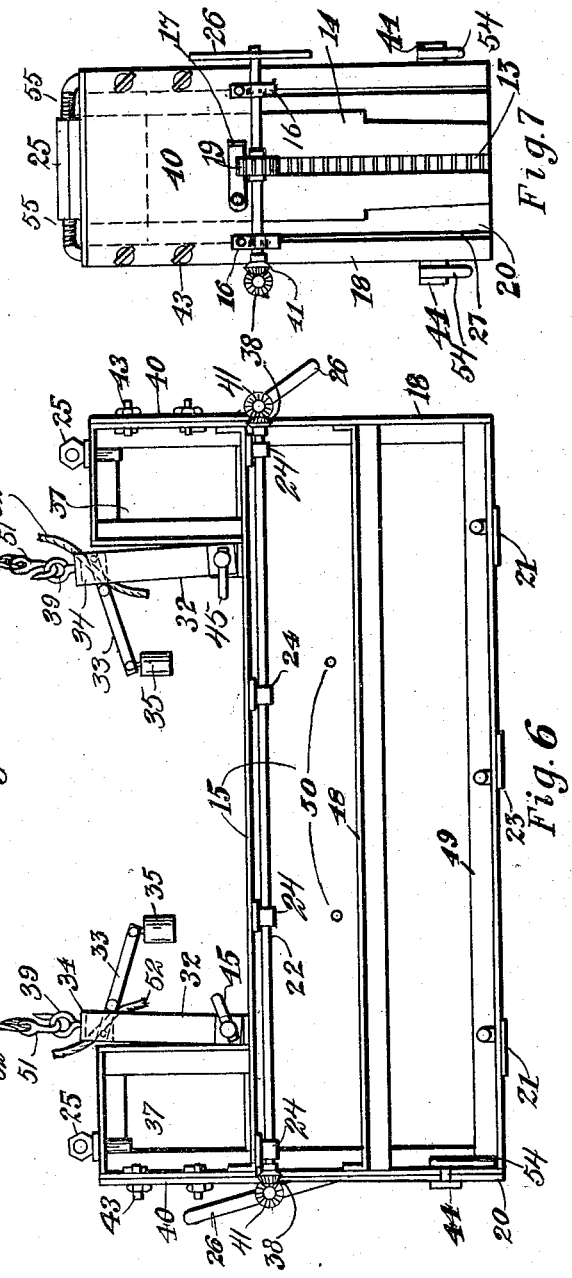
Witnesses:
Inventor
George Whitefield Chance

UNITED STATES PATENT OFFICE.

GEORGE WHITEFIELD CHANCE, OF PHILADELPHIA, PENNSYLVANIA.

MACHINE FOR MOLDING PLASTIC MATERIALS.

1,201,439.  Specification of Letters Patent.  Patented Oct. 17, 1916.

Substituted for application Serial No. 732,748, filed November 21, 1912. This application filed August 3, 1916. Serial No. 112,928.

*To all whom it may concern:*

Be it known that I, GEORGE WHITEFIELD CHANCE, a citizen of the United States, residing at Philadelphia, in the county of Philadelphia and State of Pennsylvania, have invented certain new and useful Improvements in Machines for Molding Plastic Materials, of which the following is a specification.

My invention consists in an improved molding machine for molding walls or constructions with cellular openings running through the same.

By the use of my machine, hollow or cellular walls or constructions are made of hardening plastic material in which the webs or portions connecting the sides of the construction are molded in place together with the sides, such webs being preferably composed of materials different in composition from the other parts of the wall and more moisture resisting. I use as part of the machine, suspension yokes, which enable the machine to be lifted by means of hoisting apparatus and I have designed and used on such yokes a safety device for holding the mold in position vertically over the construction; such safety device consists of means for clamping the ropes holding the machine suspended, automatically, by means of the pressure of a pin on the hoisting rope caused by a weight on the end of a lever.

The mold which I have invented specially for the purpose of building the cellular constructions referred to, consists of two sides and a core located between the same, such core is so made that it may be raised or lowered between the sides of the mold. The core is raised to clear the construction, the mold is shifted along on the wall by hand or overhead trolley and the construction started again. The mold sits on the wall and is supported thereon by one of three ways or a combinatiotn of the same; viz; by overhead suspension to a scaffolding by blocks and falls; by projections from the lower sides of the mold resting on the wall; by friction on the sides of the construction obtained by squeezing the sides together at the bottom, by means of spreading the same at the top. Inside of the mold I use thin plates which are about the size of the construction the mold builds at one setting and which I leave on the construction after the mold is removed, for the purpose of holding the construction together; these plates are held together against the outer sides of the construction by means of fasteners or ties extending through and on top of the construction, and which are afterward removed, as the construction becomes hardened.

The core of my machine is specially adapted to my method of construction where I use heated vapor or gas in the cellular openings distributed by a piping system through the construction. The bottom of the core, or core parts, is open and the top is closed, so that where hot vapors or gases are used in the cellular openings, they are arrested under the mold and held there, while the machine is working, distributing heat to the construction, thereby accelerating the hardening and strengthening it and keeping the men operating the mold comfortable in cold weather.

For a more particular description of my invention, I now refer to the drawings accompanying this specification.

Figure 1 is a perspective view of part of a small building with hollow cellular walls, a piping system to distribute gas or vapor, and a covering for heat conserving, over the top and sides of the construction; Fig. 2, is a perspective view of my machine on part of a wall; Fig. 3, is a view in elevation of a core and half core, detached; Fig. 4, is an end view of Fig. 3; Fig. 5, is a plan view of the mold; Fig. 6, is a side elevation of the mold; Fig. 7, is an end view of the mold; Fig. 8, is a face view of the top plate, detached, which is inserted between the sides of the mold to cut off the wall to a shorter length than the full length of the mold; Fig. 9, is an edge view of the stop; and Fig. 10, is a perspective view of the side plates and tie plates.

Referring to the drawings, 1 represents the foundation for a wall 2, (shown clearly in Fig. 1.) The walls 2 are provided with cellular openings 3 over which may be placed a heat conserving covering 4. Extending through the walls are pipes 7, having valves 6, for carrying vapor or gas into the cellular openings formed in the wall.

The webs 8, shown in Fig. 2, may be made of different composition from that of the balance of the wall. When forming the webs of a different composition of material I employ a web stop 9, to separate the material forming the sides of the walls from the webs 8. The web stop is removed after the mold has been filled.

The core forms 12 and also the half core forms are suspended from a channel bar 10 which extends the length of the mold and is attached to and supported by the end sliding plates 14.

The web stop above mentioned is U-shaped and rests over the top of the channel bar 10. Lugs 11 are provided upon the channel bar 10 to guide the web stop 9, and hold the same in place.

The frame of the mold consists of side and end members. Each side member consists of a plate 15 bent over at the top and strengthened by angle plates 48 and 49 which are connected at their ends by plates 18, which are also fastened to the end edges of the side plate 15. The end angle plates 18 extend above the top of the side plates 15 and an end plate 40 is fastened to said angle plates 18 by pins 43. Upon the inner surface of the end plates 40 are secured guides 42 for slidably holding the sliding plates 14 attached to the channel bar 10 carrying the core forms.

The core consists of the core units 12, the channel bar 10 and the sliding end plates 14. The core is moved vertically by means of the gear wheels 19 secured upon shafts 31 secured in bearings 16 upon the end gear plates 40. The sliding plate 14 is provided with a rack 13 into which the gear wheel 19 meshes and raises and lowers the sliding plate 14. A catch 17 is provided to engage the gear wheel 19 and lock the same.

The gear shafts 31 upon each of the end plates 40 are connected by a shaft 22 secured to the side plate 15 and by means of bevel gears 38 and 41 the two sliding end plates 14 may be moved simultaneously. A handle 26 is provided on the shaft 31 for turning the said shaft.

The bearings 16 extend below the line of the upper end plates 40 and form lugs under which the upper edge of the lower end plate 20 may enter for the purpose of holding the said lower end plate in place to close the lower end of the mold. Upon the lower end plates 20 are latches 44 which engage the angle plates 18 and hold the bottom edge of the lower end plates 20 in place upon the frame.

To support the frame upon the wall structure I provide feet 21 and 23 which are pivoted upon the lower longitudinal side angle plate 49, and said feet may be turned horizontally to rest upon the wall and support the machine.

Removable retaining plates 27, shown in detail in Fig. 10, are inserted in the mold and rest against the inner face of the side plates 15 before the mold is filled with the plastic material and to retain the structure in place after the mold has been removed. Said retaining plates are held together by clips 56 or by bolts 57, as shown in Fig. 10.

The cut off plate 47, shown detached in Figs. 8 and 9, is provided for the purpose of making the mold shorter than the entire length of the mold frame. The cut off plate 47 may be inserted over the core form 12, and at right angles with the mold to form a partition. The plate 46 of the cut off plate 47 rests upon the channel bar 10 and enters between the upturned edges of the channel bar 10. The cut off plate 47, has provided thereon lugs carrying binding screws 28 for securing the plate 47 upon the channel bar 10. Upon each depending portion of the plate 47 is a panel 29, which slides in the guides 36, and said panels 29 are adapted to be moved inwardly to form a complete partition in the mold.

To facilitate in removing the mold from the structure I provide means for spreading the lower part of the said side plates 15, consisting of using a pin 43 at each side of each end plate as pivot points upon which the side plates 15 may swing and I provide turn buckles 25 which connect the upper edges of each of the side plates 15 together. By contracting the screws of the turn buckles the upper edges of the plates 15 are drawn inwardly and the lower edges of the side plates 15 are separated; the mold may be then readily lifted off the structure, leaving the plates 27 upon the structure to retain the structure until it has hardened.

The entire mold may be lifted by the hoist ropes 52 attached to the eye bolts 39 upon the extension yokes 32 secured to the side plates 15 by fastening devices 45. The hoisting end of the rope is automatically locked to the mold by passing the rope through an angular aperture through the part 34 on the yoke 32 and the free end of the rope is held by a projection formed upon the lever 33, pivoted to the yoke 32 and carrying a weight 35 to cause the lever to grip the rope and hold the same.

What I claim is:—

1. In a mold, the combination of two sides, a core, a rack attached to each end of said core, end plates carrying shafts with pinions thereon, each pinion meshing with one of said racks, whereby a rotation of said pinion will actuate said core.

2. In a mold, the combination of two sides, retaining plates fitting against the sides, together with means for connecting the plates together at the top and bottom thereof, inside of the mold.

3. In a mold, the combination of two sides, ends, a pin at each side of each end plate pivotally connecting said end plates to the sides of the mold, means for spreading the lower edges of the sides of the mold by drawing the upper edges of the side plates together by swinging the side plates upon said pivot pins.

4. In a mold, the combination of two sides, a core between the sides composed of oblong shaped tapering parts, with parts at the ends of the core which are half the size of said oblong parts, together with vertical slides between the units and half units to close off the spaces between the units and half units.

5. In a mold, the combination of two sides, end plates connecting the said sides, a core extending from one end plate to the other, a shaft upon each end plate, a gear wheel upon each shaft engaging the said core through the end plates, a shaft upon one of said sides, and connections between said shafts for raising and lowering the core from either end of the mold.

6. In a mold, the combination of two sides, a core between the sides, and a stop or cut-off plate having an opening in the center and means to keep the surface of the plate in general at right angles to the axis of the core.

7. In a mold, the combination of two sides, adjustably spaced apart, U-shaped suspension yokes adjustably attached to the sides, with means of suspension attached to the yokes, parts attached to each side of said yokes through which a hoist rope passes on an angle line, a weight, a lever, a pin attached to the lever to press against the hoist rope and check its passage through the hole.

8. In a mold, the combination of two sides, end plates detachably connected to said side plates, shafts upon the end plates, a gear wheel upon each shaft, a shaft upon one of the side plates, means for connecting the latter shaft with the shafts upon the end plates, a core, gear racks upon each end of the core, said gear racks engaged by the said gears upon the end plates.

In testimony whereof I affix my signature in the presence of two witnesses.

GEORGE WHITEFIELD CHANCE.

Witnesses:
ROBT. J. AIKINS,
MARTHA H. QUINN.

Copies of this patent may be obtained for five cents each, by addressing the "Commissioner of Patents, Washington, D. C."